C. H. BISSELL & D. C. GIDLEY.
ELECTRIC CONDUIT FITTING AND ELECTRICAL APPLIANCE.
APPLICATION FILED OCT. 28, 1911.
1,167,039.  Patented Jan. 4, 1916.
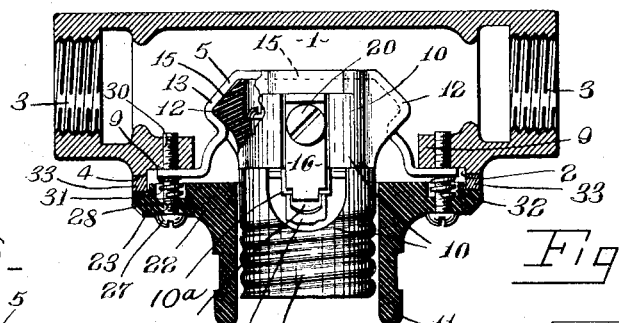
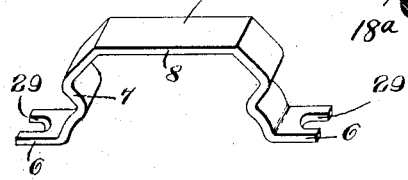
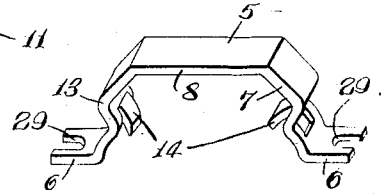
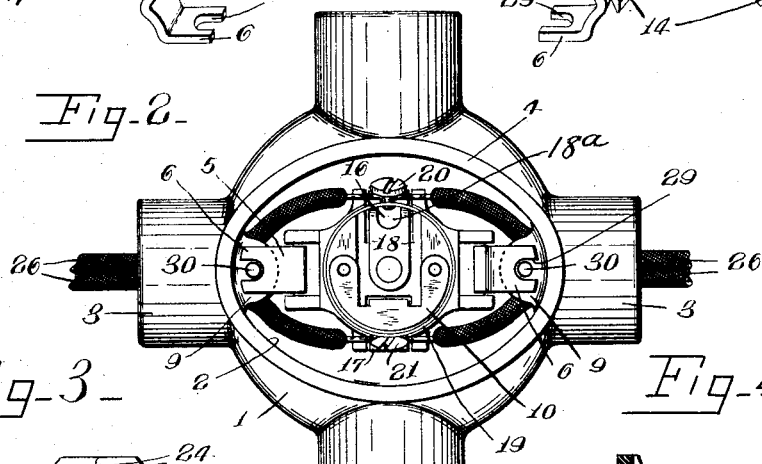

UNITED STATES PATENT OFFICE.

CARL H. BISSELL, OF SYRACUSE, NEW YORK, AND DANIEL C. GIDLEY, OF BOSTON, MASSACHUSETTS, ASSIGNORS TO CROUSE-HINDS COMPANY, OF SYRACUSE, NEW YORK, A CORPORATION OF NEW YORK.

ELECTRIC-CONDUIT FITTING AND ELECTRICAL APPLIANCE.

1,167,039.  Specification of Letters Patent.  Patented Jan. 4, 1916.

Application filed October 28, 1911. Serial No. 657,377.

*To all whom it may concern:*

Be it known that we, CARL H. BISSELL, of Syracuse, in the county of Onondaga and State of New York, and DANIEL C. GIDLEY, of Boston, in the county of Suffolk and State of Massachusetts, have invented a certain new and useful Electric-Conduit Fitting and Electrical Appliance, of which the following is a specification.

This invention has for its object the production of an electric conduit fitting and an electrical appliance therefor; and it consists in the combinations and constructions hereinafter set forth and claimed.

In describing this invention reference is had to the accompanying drawing in which like characters designate corresponding parts in all the views.

Figure 1 is a vertical sectional view of a preferable embodiment of our invention. Fig. 2 is a plan of parts seen in Fig. 1, the wires connected to the electrical appliance being also shown, and the cap of such appliance being omitted. Fig. 3 is a side elevation, partly broken away, of the cap of the electrical appliance. Figs. 4 and 5 are, respectively, a sectional view and an inverted plan of the cap. Fig. 6 is a detail view of one form of support or bridge for the electrical appliance. Fig. 7 is a detail view of another form of such support or bridge.

1 is the hollow body of the electric conduit fitting, the body having an opening 2 for an electrical appliance carried by the body, said body also having one or more means as internally threaded nipples 3, by which connection is made with the conduits inclosing the electric wires. The opening 2 is located in the side of the body opposite to the bottom of or side thereof engaging a wall or other structure.

In the illustrated embodiment of our invention the body is shown as cylindrical at its bottom or base, and the opening 2 is elliptical; and the sides of the body are shown as gradually converging toward the edge 4 around said opening 2.

5 is a support for the electrical appliance, said support being secured at diametrically opposite sides of the opening to the body, and extending in a direction crosswise of the opening, the intermediate portion thereof being provided with resilient means for detachably clamping the base of the electrical appliance.

In the illustrated embodiment of our invention, the support is in the form of a bridge formed of a strip of sheet metal, opposite ends of the bridge being formed with lugs 6 and the intermediate portion thereof being depressed into the fitting and including side and bottom parts 7 and 8. As here shown the lugs 6 engage the outer sides of inwardly extending ears 9 provided on the fitting at the opposite ends of the elliptical opening 2, the lugs 6 being secured to the ears 9 as hereinafter described.

10 is the base of the electrical appliance, here shown as a lamp socket, and 11 is the cap thereof. The base 10 extends into the fitting through the opening 2 and fits the depressed intermediate, resilient portion of the bridge 5, and is detachably clamped thereto. As here shown, the intermediate portion of the bridge 5, and the base 10 are formed with interlocking means in the form of interfitting projections 12 at opposite ends of the base and depressions 13 in the side portions 7 of the resilient portion of the bridge, the projections and surfaces of the depression having inclined engaging faces, which facilitate the engagement and disengagement of the base and its support. As seen in Fig. 7, the bridge may be formed with spring tongues 14 for entering corresponding sockets in the base. Preferably the bridge is arranged in a groove 15 formed in the bottom and ends of the base. The base is thus secured to the bridge 5 without the use of fastening devices as screws, etc. The base 10 is provided with terminals 16 and 17 which are connected respectively to the central and sleeve terminals 18 and 19 of the electrical appliance, and which extend on opposite sides of the base and are provided with binding devices as screws 20 and 21 on opposite sides of such base. The central terminal 18 is a light strip having substantially duplicate end portions and a slotted intermediate part. One end portion is secured between the end of terminal 16 and a lug 10ª projecting axially from the base 10, and the other end portion is free and spaced apart from the first-named end portion. The slot 18ª in the intermediate portion accommodates the end of the terminal 16.

The cap 11 is formed with a base portion 22 elliptical in general outline and with a central sleeve portion which incloses, in the ordinary manner, the sleeve terminal 19 of the electrical appliance. The base portion 22 is formed with a marginal flange 23, the inner surface of which is opposed to the edge 4 around the opening 2, and with shields 24 which extend into the opening 2 between the opposing sides of the base and the sides of the body 1, and protect the binding devices 20 and 21. These shields 24 are elliptically curved corresponding to the curvature of the sides of the opening 2, and preferably the end edges 25 thereof converge downwardly toward the bottom edges leaving the ends of the base exposed so that the wires, as 26, can pass without obstruction to the binding devices 20 and 21.

The cap 11 is held in position by suitable means, as screws 27, located at opposite ends thereof, said screws also serving to hold the bridge 5 in position, and to this end said screws extend through openings 28 at opposite ends of the cap 11 through openings or notches 29 in the lugs 6 of the bridge, and into threaded openings 30 in the ears 9 of the fitting. In order to permit the cap to be firmly clamped in position and have clamping movement independently of the base support 5, springs are interposed between the cap and the base or the support for the base, said springs pressing the lugs 6 against the ears 9; and preferably such springs are coiled springs 31 encircling the screws 27 and having corresponding ends thereof extending into seats or sockets 32 formed in the inner face of the cap 11 and their other ends bearing against the lugs 6. Usually a yielding gasket 33 is interposed between the flange 23 and the edge 4 of the body, and the springs 31 permit clamping movement of the cap 11 relatively to the base 10 to compress the gasket sufficiently to form a tight joint.

In operation, the bridge 5 is first detachably interlocked with the base 10, the base and bridge placed into the fitting through the opening of the fitting and the wires secured to the binding devices on the base, the cap is then placed in position and the parts secured in position by turning the fastening screws. Owing to the constructions set forth, the assembly of the parts is particularly simple, and ample space is left in the body for the passage of the wires.

It will be noted that in the illustrated embodiment of our invention, we have shown the fitting as provided with four nipples for connection with electric conduits, and the wires passing through two and such nipples only are connected to the electrical appliance. Wires passing through the other two nipples would pass entirely through the fitting, and owing to the means of supporting the base of the electrical appliance, ample space is provided for the passage of such wires between the base and the bottom of the fitting.

What we claim is:

1. The combination of an electric conduit fitting comprising a hollow body having an opening in one side thereof, a support extending across the opening and secured to the fitting at opposite sides of such opening, and having its intermediate portion formed with resilient clamping means, and an electrical appliance comprising a base extending through the opening and being detachably engaged by said resilient clamping means, substantially as and for the purpose described.

2. The combination with a body having an opening, of an electrical appliance comprising a base extending through the opening and out of holding engagement therewith, and a support extending crosswise of the opening, and including a bottom against which the base rests, the support also having resilient clamping means for engaging the sides of the base, substantially as and for the purpose specified.

3. The combination with a body having a chamber therein and an opening through one side leading to the chamber, of an electrical appliance extending through said opening and into the chamber and provided at opposite sides with outwardly facing shoulders, a support including ends for engaging with the body at opposite sides of said opening and an intermediate portion within the chamber and adapted to be sprung over said shoulders for securing the support to the appliance, and means for securing the ends of the support to the body, substantially as and for the purpose specified.

4. The combination with a body having a chamber therein and an opening through one side leading through the chamber, of an electrical appliance including a base of insulation and a metallic receiving shell mounted on the outer side of said base, and means for supporting the base in suspended position within the chamber, said means comprising an intermediate part sprung over the bottom portion of the base, and ends engaging the body at opposite sides of said opening, and means for retaining the ends in place, substantially as and for the purposes set forth.

5. The combination with a body having an opening, and an electrical appliance carried by the body and including a base extending into the opening, and a support secured to the body and extending diametrically crosswise of the opening and secured at its opposite ends to the body, the intermediate portion of the support being depressed forming a bottom against which the base rests, and resilient side portions for engaging opposite sides of the base, substantially as and for the purpose specified.

6. The combination of a body having an opening, and an electrical appliance carried by the body and including a base extending into the opening and formed with a transverse groove, and a bridge adapted to extend crosswise of the opening and being fixed at its opposite ends to the body on opposite sides of the opening, the bridge lying in the groove of the base, and the bridge and the base having interlocking means movable into and out of engagement by a relative movement of the bridge and base one toward and from the other, substantially as and for the purpose set forth.

7. The combination of a body having an opening, and an electrical appliance including a base extending into the opening, the base having a groove extending into its opposite sides and across its bottom, and a bridge secured to the base and adapted to extend crosswise of the opening and being secured at its opposite ends to the body, the intermediate portion of the bridge being depressed and lying in the groove of the base, the side portions of the bridge and the base having interlocking means, substantially as and for the purpose described.

8. The combinaton of a body having an opening, and an electrical appliance including a base extending into the opening, the base having a groove extending in its opposite sides and across its bottom, and a bridge secured to the base and adapted to extend crosswise of the opening and being secured at its opposite ends to the body, the intermediate portion of the bridge being formed with resilient clamping means and lying in the groove of the base, substantially as and for the purpose specified.

9. The combination of an electric conduit fitting comprising a hollow body having an opening in one side thereof, a bridge fixed at its ends to the fitting on opposite sides of the opening, the intermediate portion of the bridge being depressed into the fitting and comprising opposite side and bottom parts, such intermediate portion being resilient, and an electrical appliance carried by the fitting and including a base fitting within the resilient intermediate portion of the bridge and engaging with the side and bottom parts thereof, the side parts of the bridge and the base having interlocking means, substantially as and for the purpose specified.

10. The combination of an electric conduit fitting comprising a hollow body including an opening in one side thereof, and an electrical appliance carried by the fitting and comprising a base extending into the body through such opening, and a cap having a surface opposed to the edge of the wall around said opening, terminals carried by the base and extending on opposite sides of the base, the cap having shields extending through the opening into the body and covering the binding devices on the base, substantially as and for the purpose set forth.

11. The combination of an electric conduit fitting comprising a hollow body having an elliptical opening in one side thereof, and an electrical appliance carried by the fitting and comprising a base extending into the body through the opening, and a cap elliptical in general outline and having a surface opposed to the edge of the wall around the opening of the body, the base having terminals mounted thereon and extending on opposite sides thereof, the ends of the base being open for permitting wires to pass to said terminals, and the cap being formed with shields on opposite sides thereof, for covering said terminals when the cap is in position, substantially as and for the purpose described.

12. The combination of an electric conduit fitting including a hollow body having an elliptical opening in one side thereof, and an electrical appliance carried by the body and comprising a base extending into the body through such opening, and a cap elliptical in general outline and having a surface opposed to the edge of the wall around the opening of the body, the base having terminals mounted thereon and extending on opposite sides thereof, the ends of the cap being open for permitting wires to pass through said terminals, and the cap being formed with shields on opposite sides thereof for covering said terminals when the cap is in position, the shields being elliptically curved on their outer faces corresponding to the curvature of said opening, substantially as and for the purpose specified.

13. The combination of an electric conduit fitting including a hollow body, having an elliptical opening in one side thereof, and an electrical appliance carried by the body and comprising a base extending into the body through such opening, and a cap elliptical in general outline and having a surface opposed to the edge of the wall around the opening of the body, the base having terminals mounted thereon and extending on opposite sides thereof, and the ends of the cap being open for permitting wires to pass to said terminals, and the cap being formed with shields on opposite sides thereof, the shields extending through said opening into position to cover the terminals when the cap is in position, the shields being elliptically curved on their outer faces corresponding to the curvature of said opening, and the end edges of said shields converging toward the lower edges thereof, substantially as and for the purpose set forth.

14. The combination of an electric conduit fitting including a hollow body having an opening in one side thereof, an electrical appliance carried by the body and comprising a base extending into the body through such opening, and a cap having a surface opposed to the edge of the wall around said opening, screws arranged substantially diametrically opposite each other for holding the cap in position, and springs interposed between the cap and the body contiguous to the screws, substantially as and for the purpose described.

15. The combination of an electric conduit fitting including a hollow body having an opening in one side thereof, and an electrical appliance comprising a base extending into the body through such opening, and a cap, and means associated with the base for supporting the same, said means engaging the body on opposite sides of the opening, and means common to the base and the cap for clamping the cap and the supporting means for the base to the fitting, substantially as and for the purpose specified.

16. The combination of an electric conduit fitting including a hollow body having an opening in one side thereof, an electrical appliance comprising a base extending into the body through such opening, and a cap, means associated with the base for supporting the same, said means engaging the body on opposite sides of the opening, means common to the base and the cap for clamping the cap and the supporting means for the base to the fitting, and resilient means interposed between the cap and the base, substantially as and for the purpose set forth.

17. The combination of an electric conduit fitting including a hollow body having an opening in one side thereof, and supporting surfaces on opposite sides of the opening, an electrical appliance comprising a base extending into the body through the opening, and a cap engaging with the edge of the wall around the opening, supporting means associated with the base and having parts engaging said supporting surfaces, fastening means common to the base and the cap and extending through the cap, the supporting means and into the supporting surfaces, and springs encircling the clamping means and interposed between the cap and the supporting means for the base, substantially as and for the purpose described.

18. The combination with a body having an opening of an electrical appliance comprising a base extending into the opening, and a cap of insulation having a surface opposed to the edge of the body around the opening, a support for the base, the support having means adapted to engage the margin of the body around the opening, fastening members for securing the cap to the body and the support in position, and springs inserted between the cap and said support, substantially as and for the purpose set forth.

19. The combination of an electric conduit fitting including a hollow body having an opening in one side thereof, and oppositely disposed ears projecting into the opening, a support associated with the body and provided with lugs bearing against said ears, an electrical appliance comprising a base extending into the body through such opening, the base being carried by the support, and a cap having a surface opposed to the edge of the wall around said opening, and screws extending through the cap and the lugs and into the ears, substantially as and for the purpose specified.

20. The combination of an electric conduit fitting including a hollow body having an opening in one side thereof, and oppositely disposed ears projecting into the opening, a support associated with the body and provided with ears, an electrical appliance comprising a base extending into the body through such opening, the base being carried by the support, and a cap having a surface opposed to the edge of the wall around said opening, screws extending through the cap, the lugs and into the ears, and springs encircling the screws and interposed between the cap and said lugs, substantially as and for the purpose set forth.

21. The combination of an electric conduit fitting including a hollow body having an opening in one side thereof, and oppositely disposed ears projecting into the opening, a support associated with the body and provided with lugs for bearing against the ears, an electrical appliance comprising a base extending into the body through such opening, the base being carried by the support, and a cap having a surface opposed to the edge of the wall around said opening, screws extending through the cap, the lugs and into the ears, springs encircling the screws and interposed between the cap and said lugs, and a yielding gasket interposed between said surface and the edge of the wall around the opening, substantially as and for the purpose described.

In testimony whereof, I, CARL H. BISSELL, have hereunto signed my name in the presence of two attesting witnesses, at Syracuse, in the county of Onondaga, and in the State of New York, this 17th day of October, 1911, and I, DANIEL C. GIDLEY, have hereunto signed my name in the presence of two attesting witnesses, at Atlantic City, in the State of New Jersey, this 12th day of October, 1911.

CARL H. BISSELL.
DANIEL C. GIDLEY.

Witnesses to signature of applicant Bissell:
WM. CORNELL BLANDING,
C. C. SCHORNECK.

Witnesses to signature of applicant Gidley:
L. H. MARVEL,
CAROLYN ARNOLD.

Copies of this patent may be obtained for five cents each, by addressing the "Commissioner of Patents, Washington, D. C."